(12) United States Patent
Chandu et al.

(10) Patent No.: US 9,061,518 B2
(45) Date of Patent: Jun. 23, 2015

(54) INKJET NOZZLE FLUSHING MECHANISM

(71) Applicants: Kartheek Chandu, Longmont, CO (US); Larry Ernst, Longmont, CO (US)

(72) Inventors: Kartheek Chandu, Longmont, CO (US); Larry Ernst, Longmont, CO (US)

(73) Assignee: Ricoh Production Print Solutions LLC, Boulder, CO (US)

(*) Notice: Subject to any disclaimer, the term of this patent is extended or adjusted under 35 U.S.C. 154(b) by 0 days.

(21) Appl. No.: 14/524,591

(22) Filed: Oct. 27, 2014

(65) Prior Publication Data

US 2015/0103109 A1  Apr. 16, 2015

Related U.S. Application Data

(62) Division of application No. 13/935,660, filed on Jul. 5, 2013, now Pat. No. 8,905,517, which is a division of application No. 13/242,577, filed on Sep. 23, 2011, now Pat. No. 8,506,046.

(51) Int. Cl.
*B41J 2/165* (2006.01)
*B41J 2/21* (2006.01)

(52) U.S. Cl.
CPC ...... *B41J 2/2132* (2013.01); *B41J 2002/16529* (2013.01)

(58) Field of Classification Search
CPC .................. B41J 2/2132; B41J 2002/16529
See application file for complete search history.

(56) References Cited

U.S. PATENT DOCUMENTS

| | | | |
|---|---|---|---|
| 7,029,095 B2 | 4/2006 | Tsuboi et al. |
| 7,407,258 B2 | 8/2008 | Nakahara et al. |
| 7,431,420 B2 | 10/2008 | Inoue |
| 7,517,044 B2 | 4/2009 | Suzuki et al. |
| 7,537,308 B2 | 5/2009 | Yamane |
| 7,722,152 B2 | 5/2010 | Miyamoto |
| 8,287,066 B2 | 10/2012 | Jackson et al. |
| 2005/0275683 A1 | 12/2005 | Furuichi et al. |
| 2009/0167813 A1 | 7/2009 | Mitchell et al. |
| 2009/0168713 A1 | 7/2009 | Mitchell et al. |
| 2010/0002028 A1 | 1/2010 | Kawaguchi |
| 2013/0076813 A1 | 3/2013 | Chandu et al. |

*Primary Examiner* — Julian Huffman
(74) *Attorney, Agent, or Firm* — Blakely, Sokoloff, Taylor & Zafman LLP

(57) ABSTRACT

A method is disclosed. The method includes receiving print job data, rasterizing the print job data to generate image data for each page of the print job data to be printed, calculating a coverage per unit area for two or more color planes of each page of the image data and calculating a flushing mask to flush nozzles of the inkjet print head.

20 Claims, 10 Drawing Sheets

![Bank of London logo]

Peter A. Cross            December 2007 Statement

Account Information

| | |
|---|---|
| Card Number | 5555 0585 0000 5555 |
| Credit Line | €10,000.00 |
| Cash or Credit Available | €1,785.50 |

Summer of Transactions

| | |
|---|---|
| Previous Balance | €7,098.65 |
| Payments and Credits | €1,825.00 |
| Cash Advances | €500.00 |
| Purchase and Adjustments | €2,223.21 |
| Transaction Fee Finance Charges | €20.00 |
| New Balance Total | €8,214.40 |
| Total Minimum Payment Due | €178.00 |

Lap of Luxury

Receive a €50.00 certificate to the WAGGYTails Pet Day Spa "with your next Tidy" Dog Purchase.

Learn more at:
bankoflondon.co.uk/petpromo

Easy Applications:
    Speedy Approvals
        Competitive Rates

New and Used Cars!

Learn more at:
bankoflondon.co.uk/loansforyou

Number of Purchases per Month

| SEPT. | OCT. | NOV. | DEC. |
|---|---|---|---|
| 30 | 33 | 27 | 43 |

Transaction Details

| Transactions | Transaction Date | Category | Amount |
|---|---|---|---|
| #AUTO LOAN 555-555-5555 UK 555555_50 | 11/28 | C | €326.90 |
| #TeleMobile 555-55-5555 UK | 12/01 | C | €55.50 |
| #ePay Rent 555-555-5555 UK 934345.00 | 12/02 | C | €1825.00 |
| #MADAMxxxSOUND'S TAR MUSEUM 555-555-5555 UK | 12/02 | C | €38.40 |
| #GRATEFUL DOGS KENNEL 555-500-5555 UK: MA00363536778 | 12/02 | C | €58.81 |

Continued on back

Mail this payment coupon along with a check or money order payable to: BANK OF LONDON

BANK OF LONDON
POSTAL BOX 15719
WILMINGTON, UK, EC5L 3YU

☐ Check here for a changes of mailing adress or phone number(s)
Please provide all connections on the receive side :1988557396c
PETER A CROSS
2425 Pelham Crescent
Bristol, UK
GL32 UBN

*2010999999163*

23    0082144900017800001825000004888935014 7187

Payment Information

| | |
|---|---|
| ACCOUNT NUMBER: | 5555 0505 0000 5555 |
| NEW BALANCE TOTAL: | €8,2:14.49 |
| PAYMENT DUE DATE: | 01/22/07 |
| TOTAL MINIMUM PAYMENT DUE: | €1,78.00 |
| Enter Payment Amount Enclosed: | € |

FIG. 2

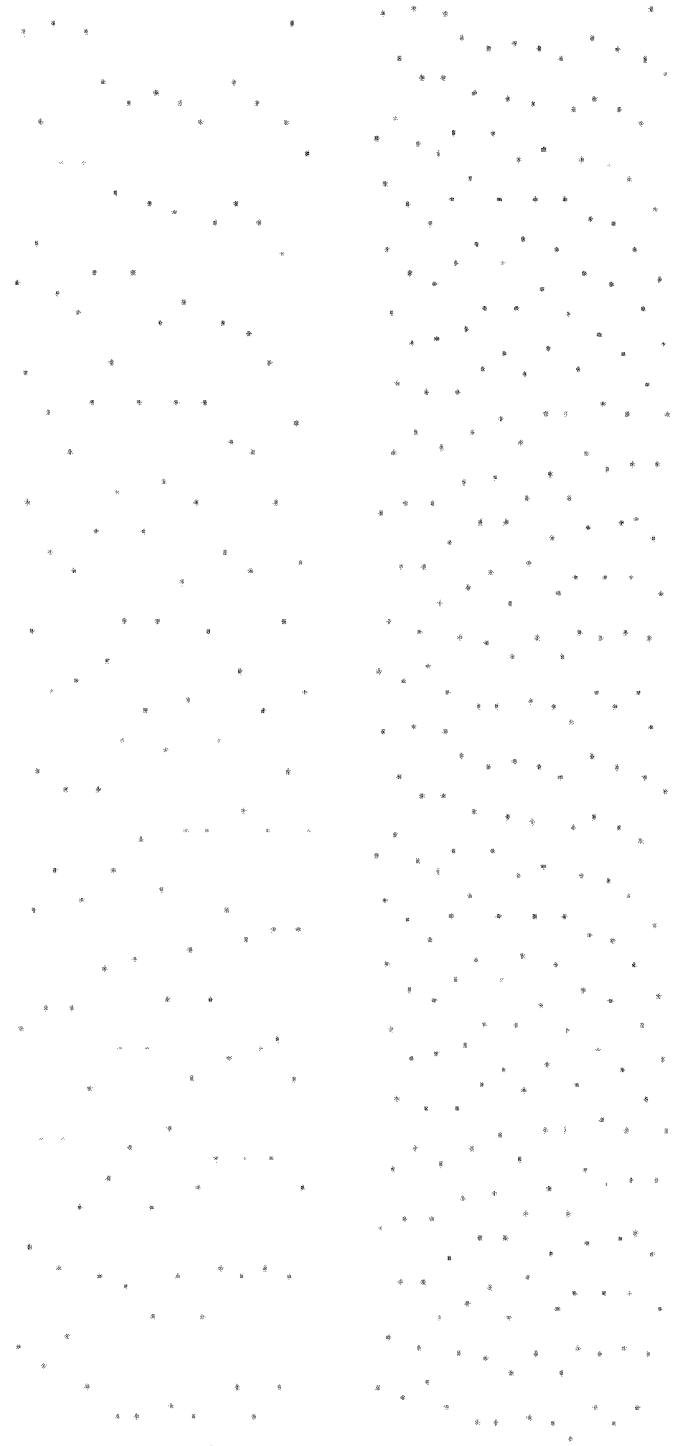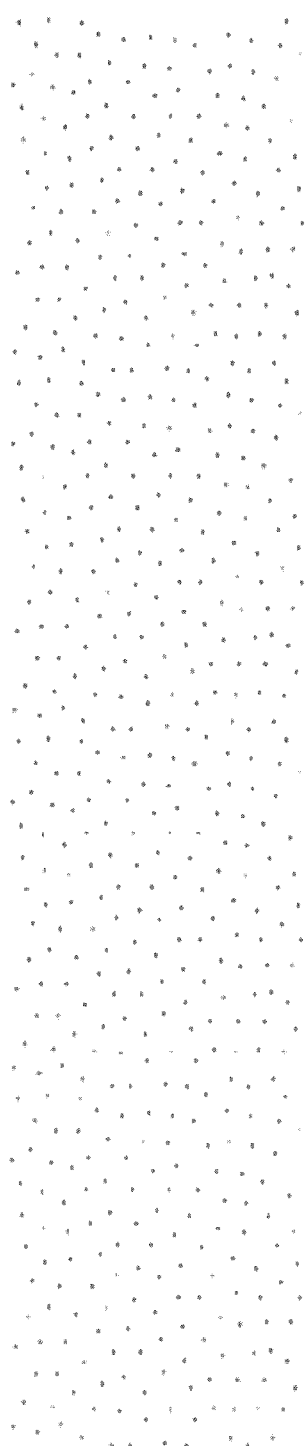
One dot per inch pattern   Two dot per inch pattern   Four dot per inch pattern
FIGURE 8

INKJET NOZZLE FLUSHING MECHANISM

This application is a divisional application of application Ser. No. 13/935,660, filed Jul. 5, 2013, currently, which is a divisional application of application Ser. No. 13/242,577 (now U.S. Pat. No. 8,506,046), and claims priority thereof.

FIELD OF THE INVENTION

The present invention relates to the field of printing, and in particular, to flushing the nozzles in an inkjet printer.

BACKGROUND

An ink jet printer is as an example of a printing apparatus that ejects droplets of ink onto a recording medium such as a sheet of paper, for printing an image on the recording medium. The ink jet printer includes a head unit having at least one ink jet head provided with an ink cartridge that accommodates the ink. In operation of the head unit, the ink is supplied from the ink cartridge to each ink jet head having ejection nozzles, so that a printing operation is performed by ejection of the ink droplets from selected ejection nozzles.

However, ink jet printers may suffer from a problem of evaporation of solvent from the ink causing an increase in the ink viscosity that leads to nozzle clogging and the inability to fire an ink droplet under normal conditions. A clogged nozzle may not only result in diminished print quality, but may require the expense of replacing the entire print head. To solve this problem, there has been practiced a so-called "flushing operation" wherein the ink is forcibly discharged from the ejection nozzles which are open in a nozzle surface of each ink jet head.

Several flushing methods in existence have undesirable effects upon image quality. One such flushing method involves printing a line across the top or bottom of each page to flush the nozzles. In this method, each nozzle produces multiple drops forming a wide line across the top or bottom of the printed page. The drawback of this approach is that it leaves a large colored line at the bottom of every page and many customers do not have the post-processing equipment to remove it.

Another method involves randomly firing drops from all nozzles at a specified frequency throughout the printing of a job. The drawback to this approach is that the indiscriminate firing of the nozzles during the printing can cause excessive background noise and alter the color and accuracy of the printed images.

Intelligent flushing methods exist that lessen the problem of the flushes interfering with image quality, but these methods are also undesirable because they are computationally intensive. Thus, the throughput speed of the printers is negatively affected. One such method involves flushing the color ink dispensing nozzles onto points of the page where black ink will ultimately be printed. By effectively hiding the color ink droplets under black ink from the job data, the image quality may be preserved. However, this method requires additional data processing, slowing down the high speed printing process.

Additional problems exist with the current flushing methods. For instance, current flushing methods require all nozzles to be flushed at the same frequency. This results in wasted ink where a user knows that one color needs to be flushed less frequently than another.

Consequently, what is a needed is a mechanism for flushing the nozzles of an inkjet print head during printing that preserves the integrity of the printed images.

SUMMARY

In one embodiment, a method is disclosed. The method includes receiving print job data, rasterizing the print job data to generate image data for each page of the print job data to be printed, calculating a coverage per unit area for two or more color planes of each page of the image data and calculating a flushing mask to flush nozzles of the inkjet print head.

In further embodiment, a printer is disclosed. The printer includes a control unit to receive print job data, rasterize the print job data to generate image data for each page of the print job data to be printed, calculate a coverage per unit area for two or more color planes of each page of the image data and calculate a flushing mask. The printer also includes an inkjet print head having a plurality of ink nozzles flushed according to the flushing mask.

BRIEF DESCRIPTION OF THE DRAWINGS

Embodiments of the present invention may be understood more fully from the detailed description given below and from the accompanying drawings of various embodiments of the invention. The drawings, however, should not be taken to be limiting, but are for explanation and understanding only.

FIG. 2 illustrates one embodiment of a page printed at the print system;

FIG. 8 illustrates embodiments of flushing patterns;

DETAILED DESCRIPTION

An inkjet printer flushing mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
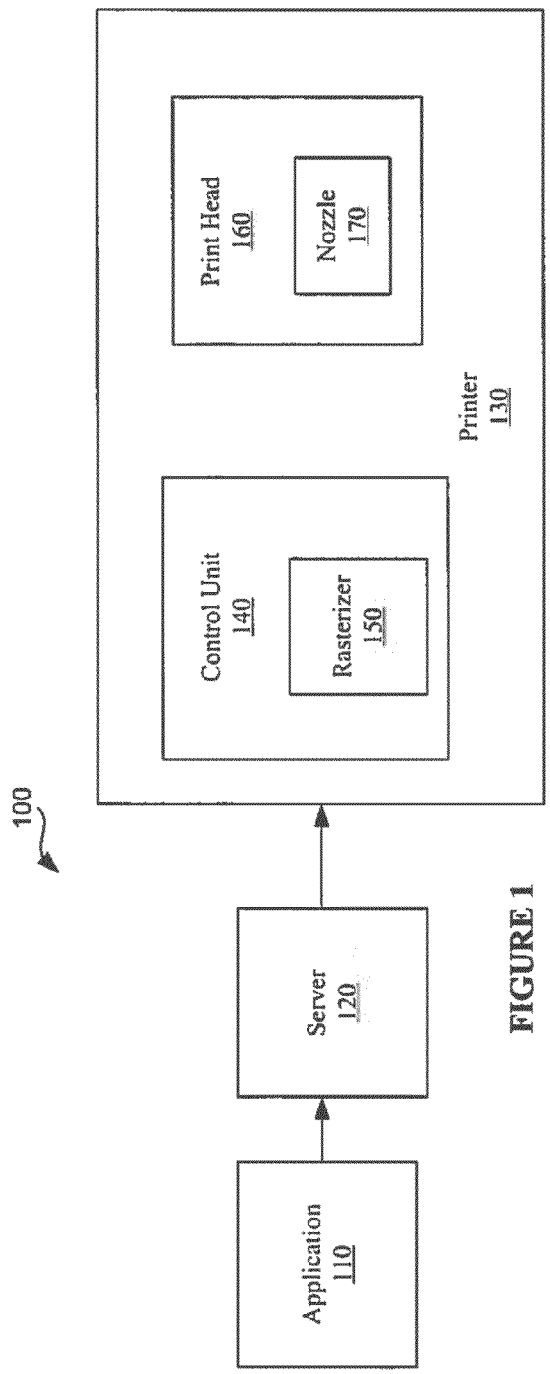
FIG. 1 is a block diagram illustrating one embodiment of a print system.

FIG. 1 illustrates one embodiment of a printing system 100. Printing system 100 includes a print application 110, a server 120 and a printer 130. Print application 110 makes a request for the printing of a document. In one embodiment, print application 110 provides a Mixed Object Document Content Architecture (MO:DCA) (also called an Advanced Function Presentation (AFP)) data stream to print server 120. Although in other embodiments, alternative presentation formats (e.g., Portable Document Format (PDF) data) may be provided by print application 110.

Print server 120 processes pages of output that mix all of the elements normally found in presentation documents, e.g., text in typographic fonts, electronic forms, graphics, image, lines, boxes, and bar codes. In one embodiment, print server 120 communicates with a control unit 140 within printer 130 to facilitate the interactive dialog between print server 120 and printer 130. Printer 130 also includes a print head 160. Control unit 140 processes and renders objects received from print server and provides sheet maps for printing to print head 160. Control unit 140 includes a rasterizer 150 to prepare pages for printing.

Particularly, rasterizer 150 includes a raster image processor (RIP) that converts text and images into a matrix of pixels (bitmap) that will be printed on a page. In one embodiment, print head 160 is a fixed, wide-array inkjet print head including one or more nozzles 170 that are implemented to spray droplets of ink onto a sheet of paper in order to execute a print job. However, print head 160 may include other types of ink jet print heads, as well as a moving print head design.

As discussed above, nozzles 170 may suffer from an increase in ink viscosity that leads to clogging and the inability to spray ink. For instance, referring to FIG. 2, a page 200 is illustrated representing a document printed at printer 130. As shown in FIG. 2, page 200 includes various white spaces that represent areas where no ink is applied. Thus, whenever printer 130 prints a job having a large number of pages similar to page 200, a number of nozzles 170 are seldom used, if used at all. Therefore, a flushing operation is performed at printer 130 in order to forcibly discharge ink from the nozzles.

Figure 3:
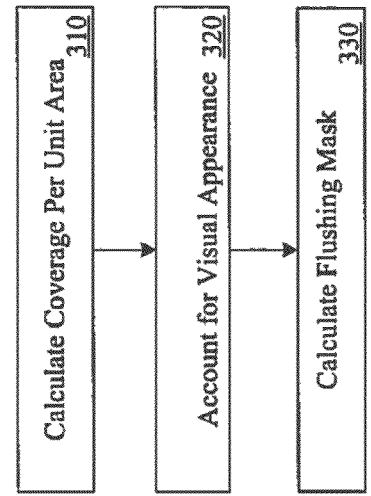
FIG. 3 is a flow diagram for one embodiment of performing a flushing operation.
Figure 4A:
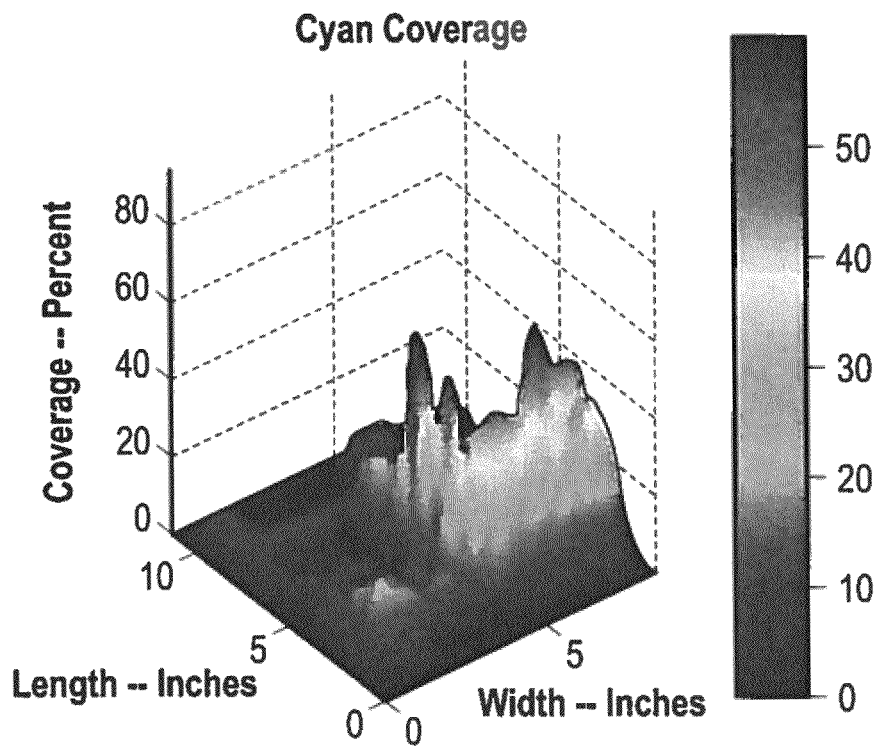
FIGS. 4A-D illustrate embodiments of color coverage area calculations.
Figure 4B:
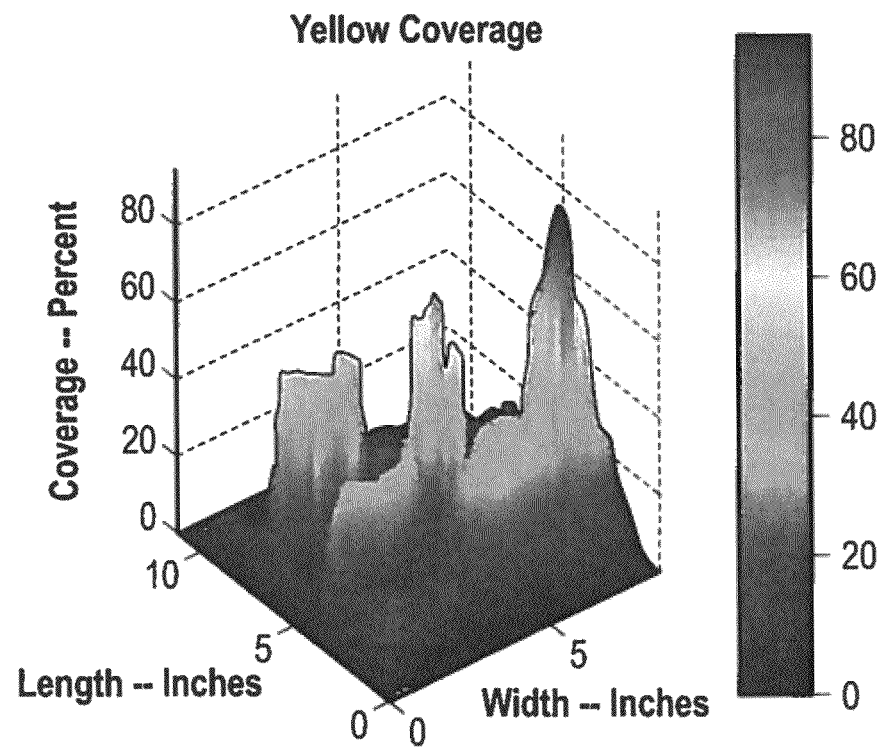
Figure 4C:
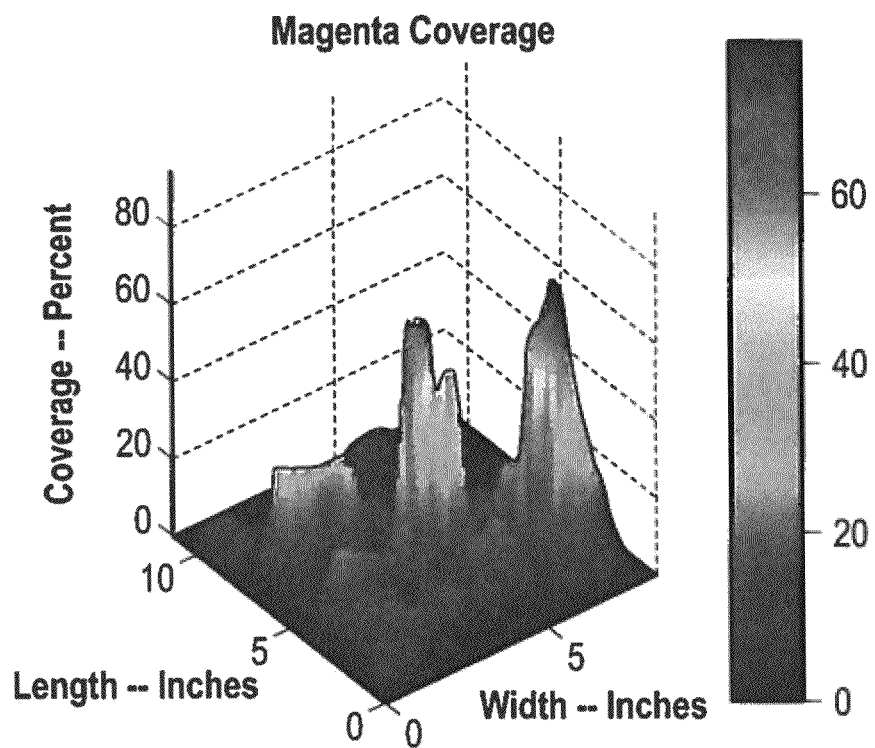
Figure 4D:
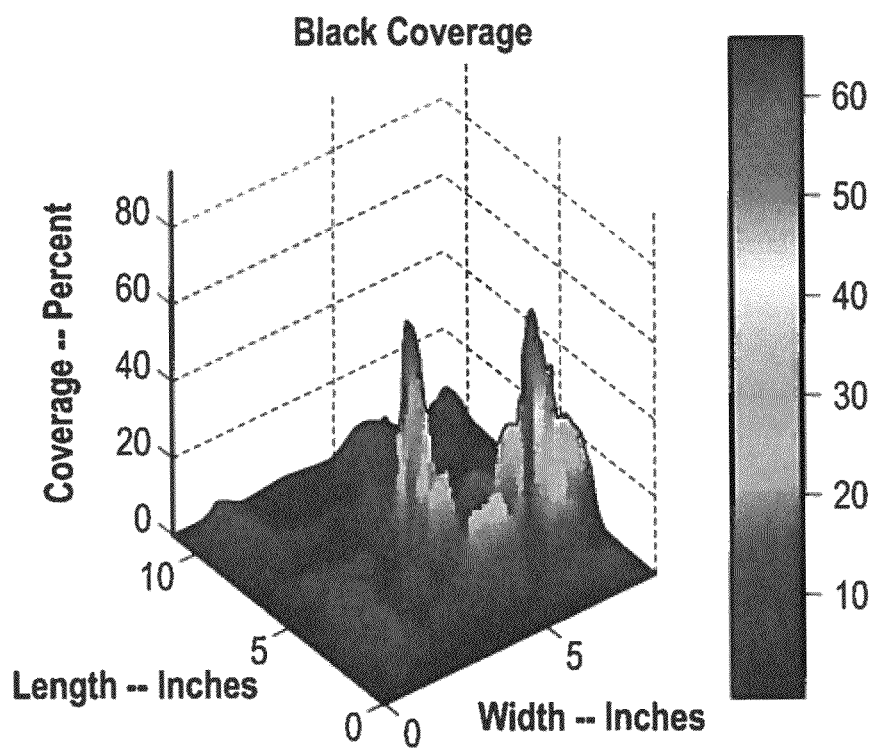

According to one embodiment, control unit 140 facilitates flushing operations at nozzles 170 that are inadequately used during the printing of jobs. FIG. 3 is a flow diagram for one embodiment of a process performed by control unit 140 to facilitate nozzle flushing. At processing block 310, a coverage per unit area of each sheet-side to be printed is calculated.

At processing block 320, the visual appearance of image data from other color planes is accounted for. At processing block 330, a random flushing mask is calculated in order to achieve particular criteria. In one embodiment, the criteria includes minimizing an amount of flushing ink required, achieving a pleasing human visual system (HVS) mask for each color plane when flushing density is sufficiently high to be visible on a printed medium (e.g., paper) and adjusting flushing density based on digital counts for the various color planes.

In one embodiment, process of calculating the coverage per unit areas includes performing the calculation for each color plane. In such an embodiment, coverage for each color plane is defined as an average digital count divided by 2.55 for an eight bit image system over a defined/unit area. For the purpose of this description, the unit area is 1 inch by 1 inch, with the number of sample points being 16 per 1 square inch. Thus, the coverage is calculated over a 1 square inch area, where the sample point is the center of a 1 square inch area Because the calculations are performed every ¼inch, the surface formed based on the sample points effectively passed through a low pass filter so the coverage function has limited high frequency information to minimize rapid change. FIGS. 4A-D illustrate embodiments of color coverage area calculations with interpolating between sample points.

Figure 5:
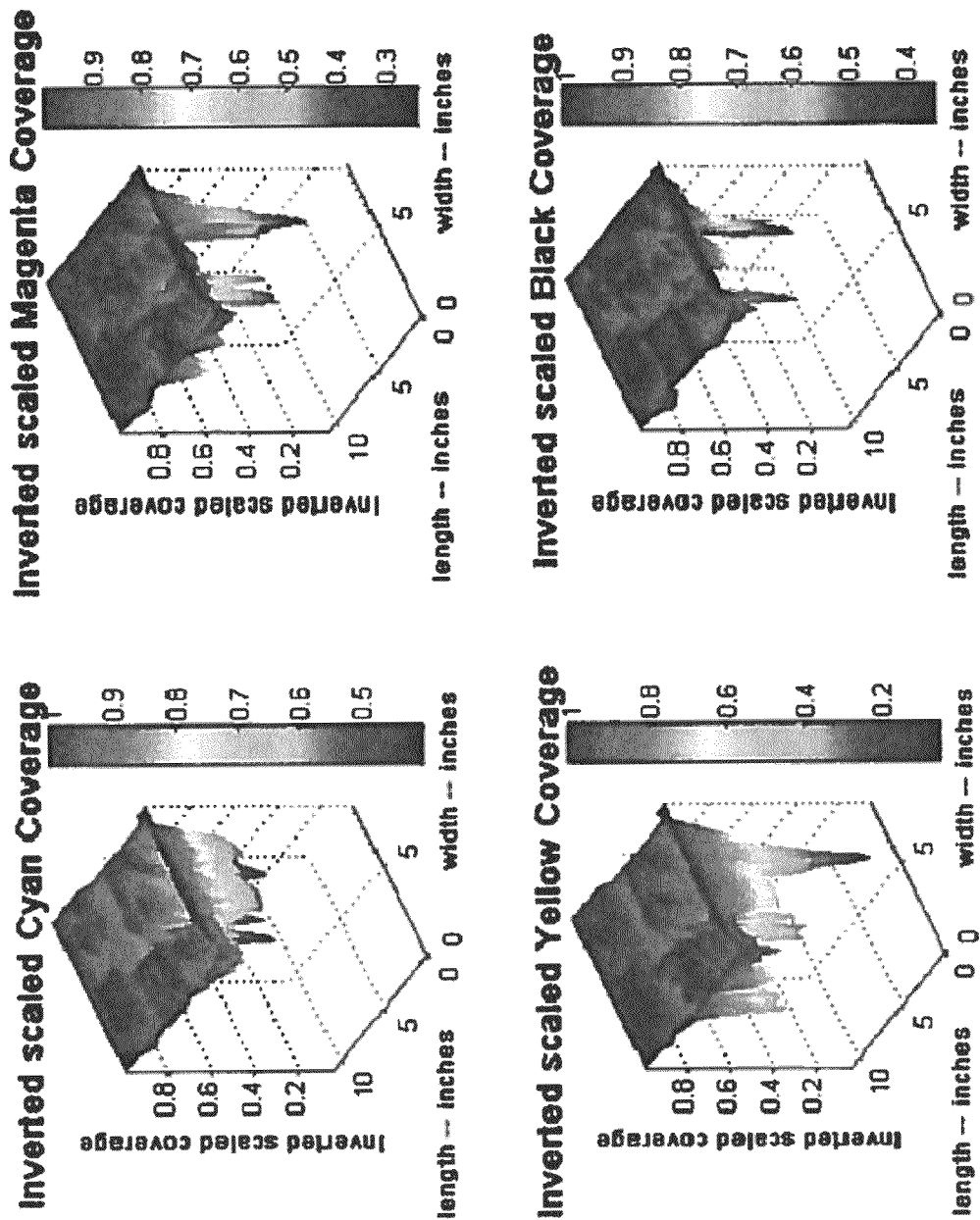
FIG. 5 illustrates one embodiment of normalized color functions.

Subsequently, the coverage functions shown in FIGS. 4A-D are converted to provide an estimate of a probability function relating when flushing is required. In one embodiment, the conversion process includes normalizing each coverage function in FIGS. 4A-D plots by dividing the coverage function by 100 and inverting the resulting function by subtracting the function from 1. FIG. 5 illustrates one embodiment of the results for the normalized and inverted color functions.

Figure 6:
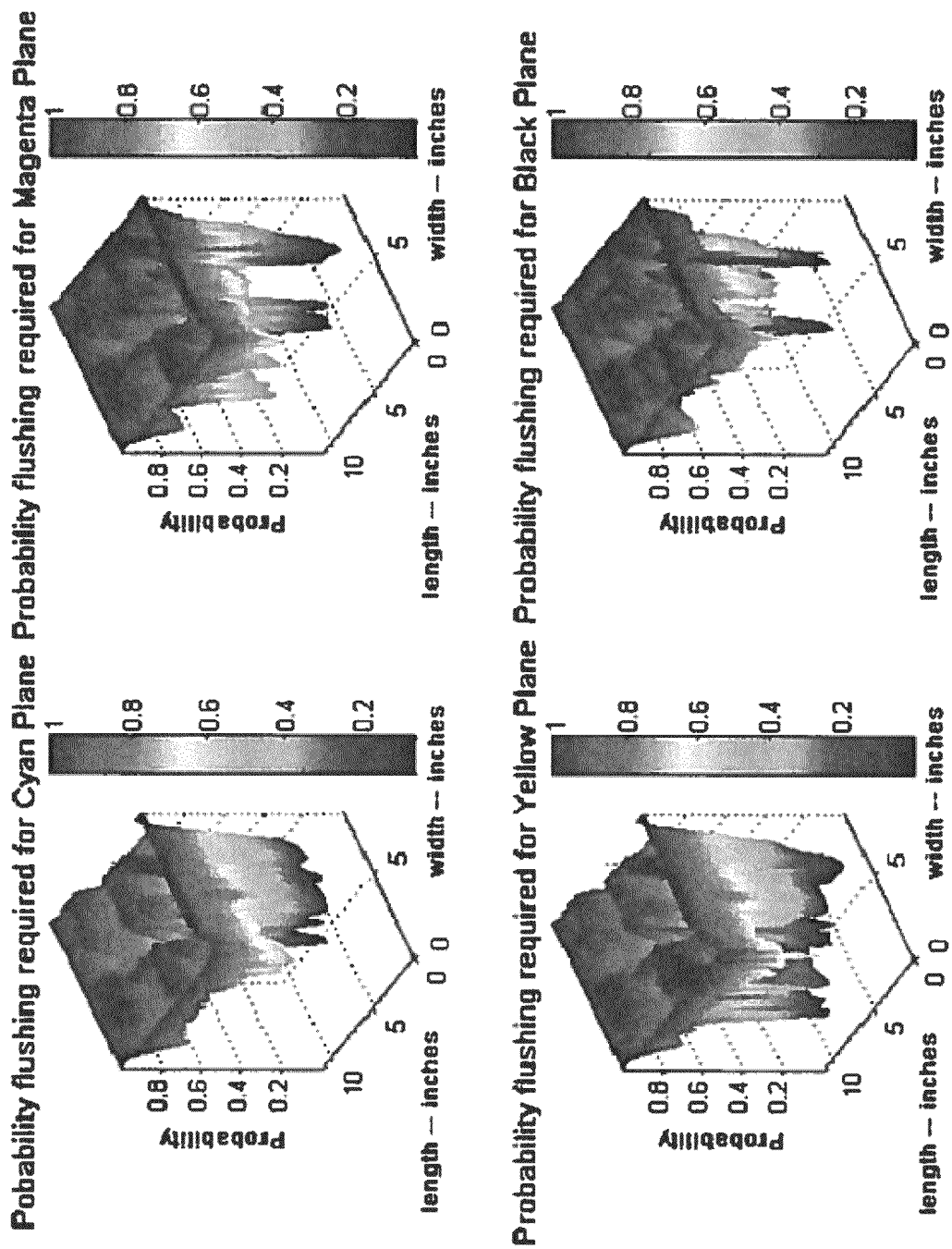
FIG. 6 illustrates one embodiment of re-scaled color functions.

Next, the resulting function is re-scaled to account for the difference between the function above and the effect of nozzle clogging not related to ink volume ejected. In one embodiment, the scaling includes saturation so that once a certain ink volume is jetted per unit area no additional jetting is required to prevent clogging. In one embodiment, a basic fundamental assumption for this process is related to actual ink volume jetted per unit time. Because medium velocity in the process direction is constant, the process is related to actual ink volume jetted per unit area. FIG. 6 illustrates one embodiment of re-scaled color functions. The results shown in FIG. 6 assumes that the function described by FIG. 5 is cubed to account for nozzle clogging not related to actual ink volume jetted per unit area.

The process of calculating a flushing mask includes superimposing a constant halftone tint over a printed page independent of print job page data. In one embodiment, the mask places a pleasing image over the pages to ensure all ink jet nozzles are adequately used. To achieve the above-recited criterion of minimizing ink flushing utilization is implemented by modulating a constant level using a probability function, where flushing is required as a function of page location.

In one embodiment, the probability function is described by the surface function described in FIG. 6. In a further embodiment, the function may be represented as a multi-dimension LUT or a curve fitted function (e.g., curve fitting techniques). The product of a constant and the probability function describes the flushing tone density to be implemented across a sheet-side if the interactions with other color planes are neglected. This result is called tone density function.

To account for interaction with other color planes, the tone density function is multiplied by a function (either continuous function or logic function) accounting for the interaction with other color planes. In one embodiment, the function relates flushing to the other color planes where the flushing density should be either increased or decreased for various reasons.

The resulting function may be referred to as a flushing density modulation function. Interaction with other color planes is accounted for because a cyan, magenta, or black flushing drops in a solid yellow area is perceived as not a pleasing appearance, and because increasing the flushing density for allowable areas by takes into account the areas not available due to other color plane interactions.

The above described flushing mask formation performs random flushing independent of counting the number of times each individual nozzle ejects ink drops. Thus, the flushing pattern is applied in the location desired instead of depending on feedback from individual ink jet nozzles ejection count. However, the described embodiment may be computational expense despite being highly functional. Accordingly, various embodiments may be implemented to simplify the procedure in order to realize a practical implementation.

In one such embodiment, the flushing pattern is made to depend on location (for visually pleasing characteristics) and does not depend on the intensity and/or digital count. In this embodiment, the flushing intensity modulation function is factored out of the visually pleasing process, (e.g., product of the function and the process for a constant level). The visually pleasing overlay can be generated for the case when the probability of flushing required equals 1. The visually pleasing overlay is multiplied times the probability to achieve desired personalized overlay for the sheet-side. Thus the overlay combination of visually pleasing and the probability function varies the flushing density using drop size where the location for every drop (independent of size) is the same.

In another embodiment, the low pass (filtering) averaging is eliminated. Thus, the calculation depends on a single coverage sample per unit area converted to a probability with interpolation between sample points. An alternative embodiment uses one of several visually pleasing masks based on the probability for the area the mask covers (e.g., with or without low pass filtering). This embodiment allows a possible noticeable step change in background if visible.

In yet another embodiment, the computational expense is minimized for controller 140 by generating a lookup table LUT relating the plane intensity value to the desired drop size for flushing. The flushing overlay is generated for the case when all white pages are printed (or equivalently the probability flushing required equals 1). Subsequently, the plane at the pel locations is sampled where the flushing overlay defines a drop of ink. From the LUT, the digital value in the overlay is changed to correspond to the correct ink drop size.

An exemplary system implemented to simplify the procedure may include printer 130 rasterizing and halftoning the print data, and then adding a flushing pattern to the print data. The flushing of a nozzle usually occurs at a data point of the flushing pattern that corresponds to a data point of the page of print data. The developed flushing pattern has a pleasing appearance where the dots are arranged in an unstructured pattern approximately matching the filter response in the human visual system.

In one embodiment, the flushing pattern is merged with print job data with the print data occurs so that a data point of the pattern is not included where there exists a corresponding data point in the print data. Because the merging of the flushing pattern with the print data is not computationally intensive, there is no slow down of the throughput of printer.

Figure 7:
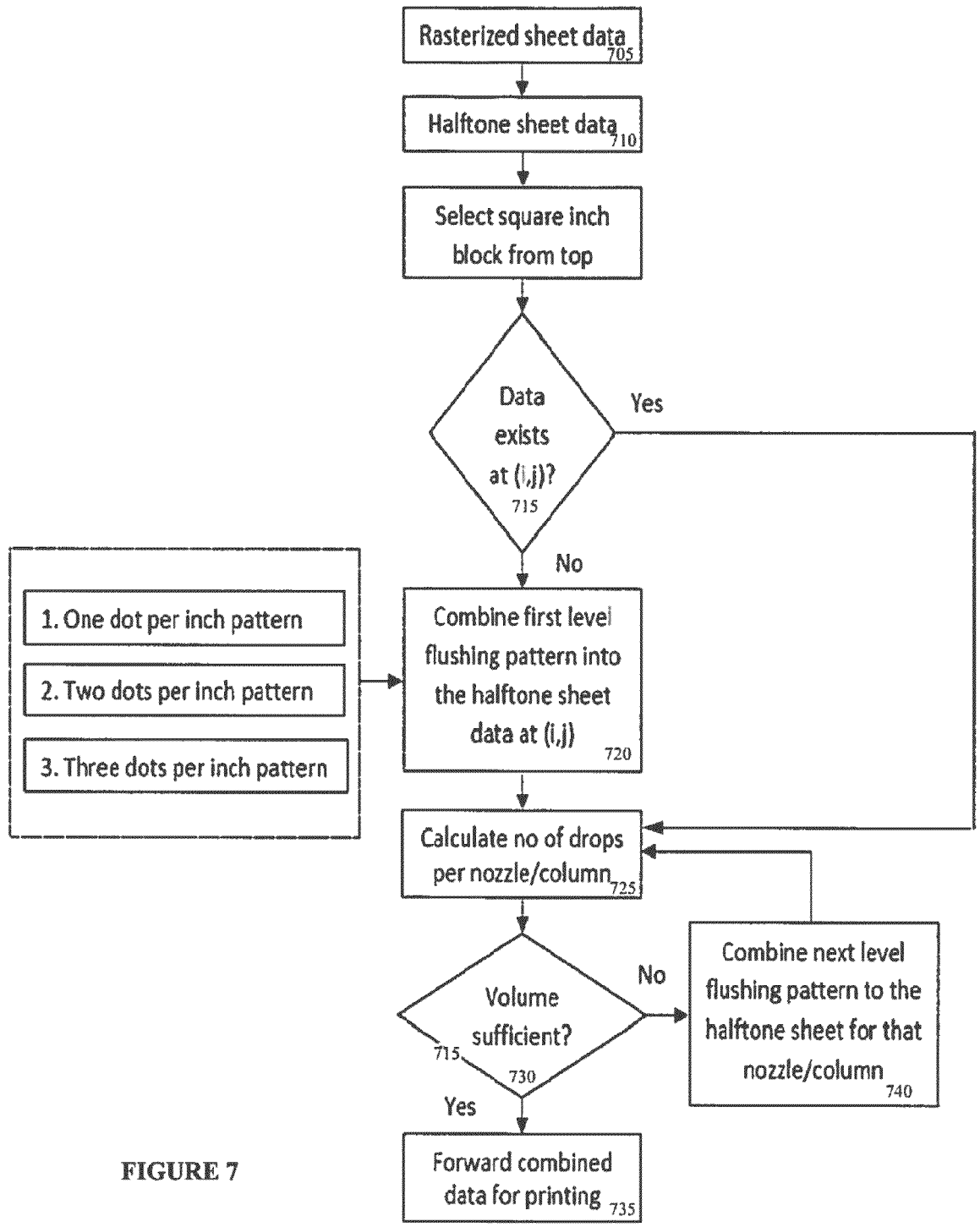
FIG. 7 is a flow diagram for one embodiment of merging a flushing pattern with print job data.

FIG. 7 is a flow diagram illustrating one embodiment of merging a flushing layout with print job data. At processing block 705, the sheet data is rasterized. At processing block 710, the sheet data is halftoned. At processing block 715, a square inch block from the top of the sheet data is selected. At decision block 720, it is determined for every point (i,j) of a page to be printed, whether print job data exists. If job data exists at a point (i,j), flushing will be ignored from the halftone sheet data at the position on the page where the flushing is set to occur.

However if the halftone sheet data does not include a data point at (i,j), the point (i,j) of the flushing pattern is combined into the print job data, processing block 725. At processing block 730, the number of dots at every nozzle/column is calculated. At decision block 735, it is determined whether the ink volume is sufficient. If the volume is not sufficient, the next level of pattern (e.g., two dots or three dots per inch) is combined to that nozzle/column until that nozzle ejects minimum volume of ink at that frequency, processing block 740. Subsequently, control is returned to processing block 730. FIG. 8 illustrates embodiments of flushing patterns.

Figure 9A:
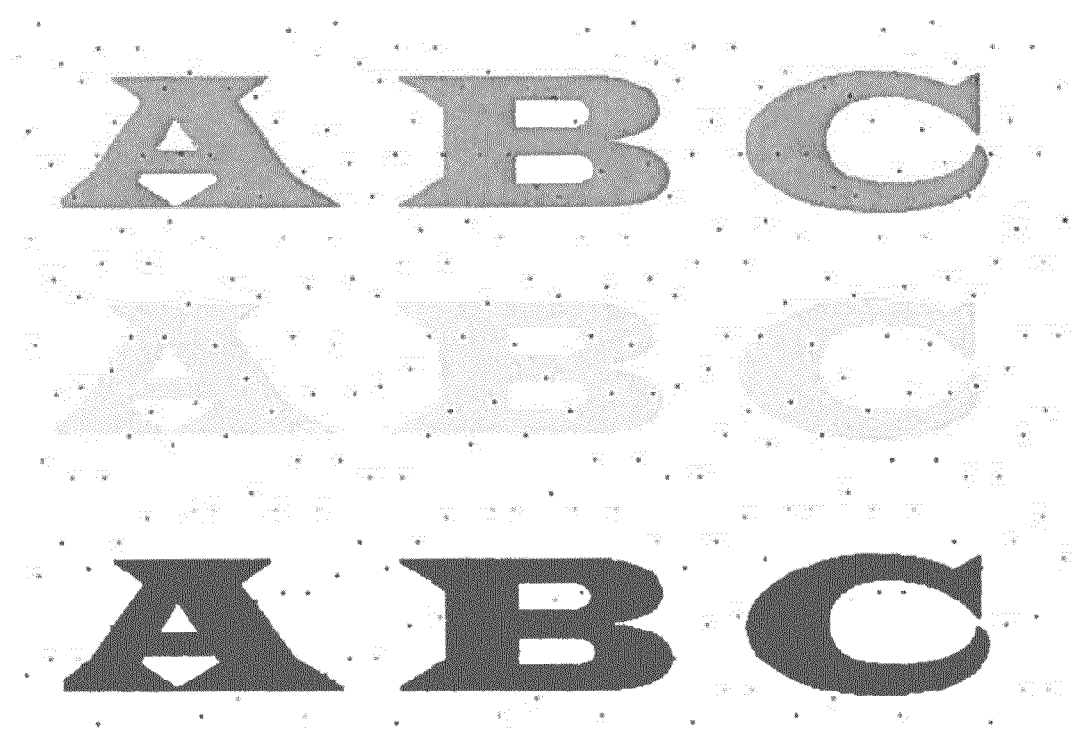
FIGS. 9A and 9B illustrates embodiments of merged flushing patterns with print job data.
Figure 9B:
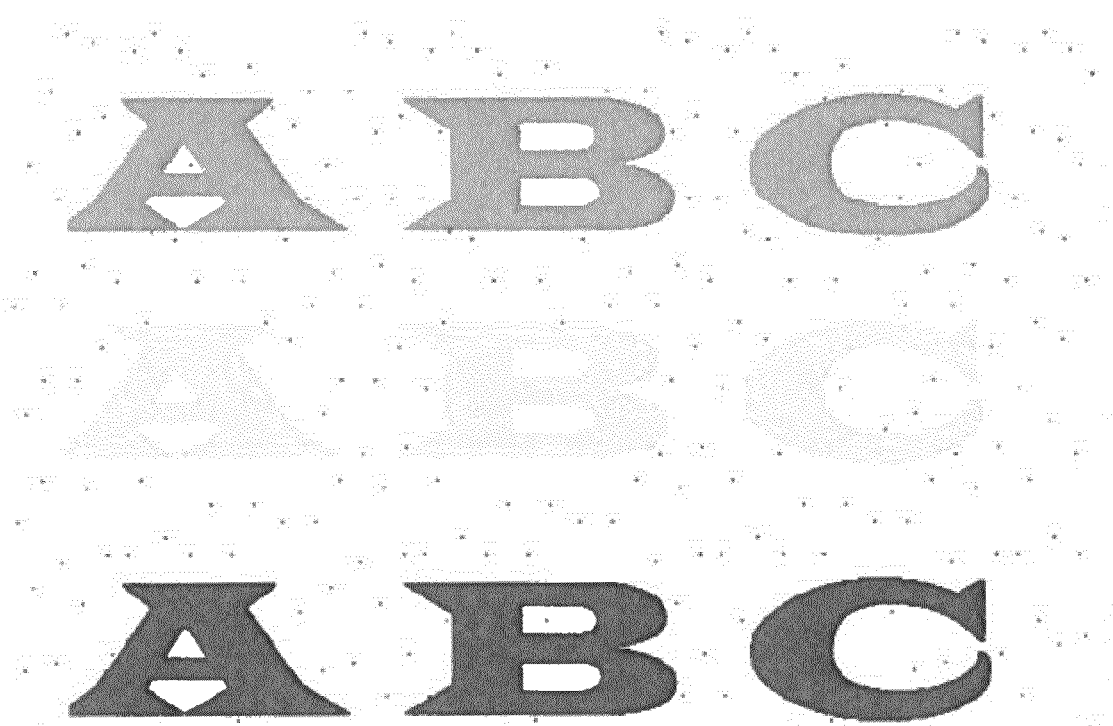

If the volume is sufficient, the combined data is forwarded for printing, processing block 745. This process prevents the flushing from directly interfering with the integrity of the original print data, and where the flushing does occur, visually pleasing characteristics reduce the visibility of the flushing pattern, resulting in minimized impact on the image integrity of the original print job. FIGS. 9A and 9B illustrates embodiments of merged flushing patterns with print job data. FIG. 9A illustrates a conventional flushing pattern in which the flushing dots are sprayed on data points, while in FIG. 9B, no dots are included at points (i,j) where print job data exists.

In another embodiment, multi-channel ink systems may also be flushed in a visually pleasing manner as explained below. For instance, many printers are capable of including more than one ink type, and all of the print heads/nozzles using these different inks are flushed to prevent drying. This flushing could lead to noisy background on the paper, which will be objectionable for printer 130 users. According to one embodiment, a visually pleasing flushing mask is generated as explained above, and the mask is de-interlaced and distributed among different inks.

Figure 10:
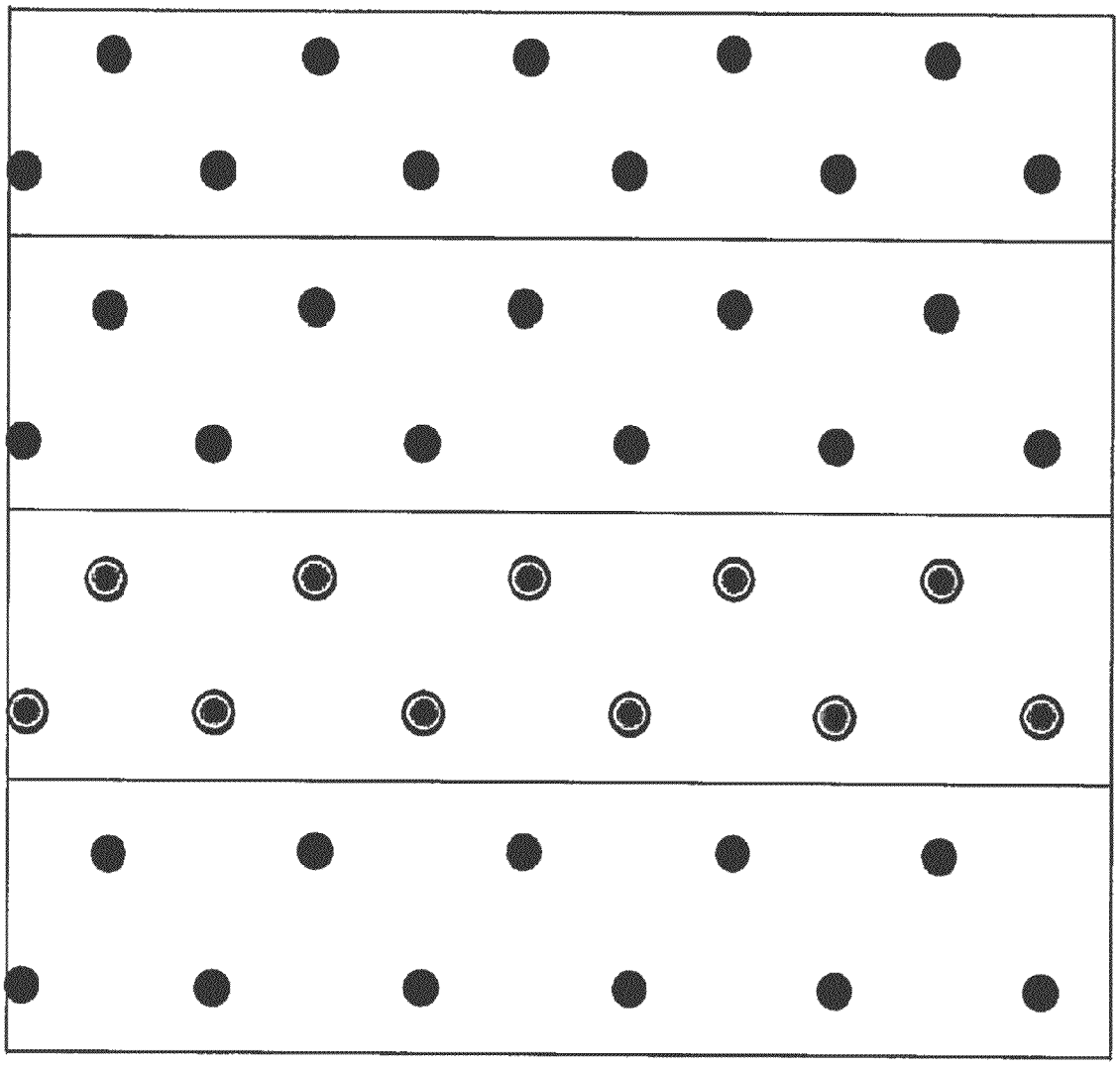
FIG. 10 illustrates one embodiment for flushing a multi-channel ink system.

For example, printer 130 may have to flush six channels (e.g., Cyan (C), Magenta (M), Yellow (Y), Black (K), Reserve1 (R1) and Reserve2 (R2)). R1-channel and R2-channel can be any colorant inks. For the purpose of this description, assume R1-channel and R2-channel are also black colored inks. In one embodiment, the flushing pattern is de-interlaced into 4 dot groups. Three of the dot groups will be used by R1-channel, R2-channel and the K-channel. The R1-channel and R2-channel could be on the same engine or on a different engine but flushing on the same side of the paper. The fourth group will be used by C, M, Y channels such that they form a composite black drop when printed. This will make the background appearance as single black colored ink flushing pattern instead of a noisier and denser pattern that present system produces. FIG. 10 illustrates one embodiment for flushing a multi-channel ink system.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims that follow.

What is claimed:
1. A method comprising:
  receiving print job data;
  rasterizing the print job data to generate image data for each page of the print job data to be printed;
  calculating a coverage per unit area for two or more color planes of each page of the image data; and calculating a de-interlaced flushing mask to flush nozzles in multiple channels of the inkjet print head.

2. The method of claim 1 wherein multiple channels comprise Cyan (C), Magenta (M), Yellow (Y), Black (K), Reserve1 (R1) and Reserve2 (R2)) channels to be de-interlaced into four groups.

3. The method of claim 2 wherein the K channel comprises a first group, the R1 channel comprises a second group, the R2 channel comprises a third group and the CMY channels comprise a fourth group.

4. The method of claim 3 wherein the R1 and R2 channels comprise black colored inks.

5. The method of claim 4 wherein the CMY channels form a composite black drop when printed for the flushing mask.

6. The method of claim 1 wherein flushing does not occur at a nozzle corresponding to a data point of print data.

7. The method of claim 6 wherein flushing is implemented by modulating a constant level using a probability function.

8. The method of claim 1 wherein the flushing mask is calculated to achieve one or more criteria.

9. A printer comprising:
   a control unit to receive print job data, rasterize the print job data to generate image data for each page of the print job data to be printed, calculate a coverage per unit area for two or more color planes of each page of the image data and calculate a de-interlaced flushing mask; and
   an inkjet print head having multiple channels including a plurality of ink nozzles flushed according to the flushing mask.

10. The printer of claim 9 wherein the multiple channels comprise Cyan (C), Magenta (M), Yellow (Y), Black (K), Reserve1 (R1) and Reserve2 (R2)) channels to be de-interlaced into four groups.

11. The printer of claim 10 wherein the K channel comprises a first group, the R1 channel comprises a second group, the R2 channel comprises a third group and the CMY channels comprise a fourth group.

12. The printer of claim 11 wherein the R1 and R2 channels comprise black colored inks.

13. The printer of claim 12 wherein the CMY channels form a composite black drop when printed for the flushing mask.

14. An article of manufacture comprising a machine-readable medium including data that, when accessed by a machine, cause the machine to perform operations comprising:
   receiving print job data;
   rasterizing the print job data to generate image data for each page of the print job data to be printed;
   calculating a coverage per unit area for two or more color planes of each page of the image data; and
   calculating a de-interlaced flushing mask to flush nozzles in multiple channels of the inkjet print head.

15. The article of manufacture of claim 14 wherein multiple channels comprise Cyan (C), Magenta (M), Yellow (Y), Black (K), Reserve1 (R1) and Reserve2 (R2)) channels to be de-interlaced into four groups.

16. The article of manufacture of claim 15 wherein the K channel comprises a first group, the R1 channel comprises a second group, the R2 channel comprises a third group and the CMY channels comprise a fourth group.

17. The article of manufacture of claim 16 wherein the R1 and R2 channels comprise black colored inks.

18. The article of manufacture of claim 17 wherein the CMY channels form a composite black drop when printed for the flushing mask.

19. The article of manufacture of claim 14 wherein flushing does not occur at a nozzle corresponding to a data point of print data.

20. The article of manufacture of claim 14 wherein the flushing mask is calculated to achieve one or more criteria.

* * * * *